US010265923B2

(12) United States Patent
Marcoe et al.

(10) Patent No.: US 10,265,923 B2
(45) Date of Patent: Apr. 23, 2019

(54) THERMOPLASTIC COMPOSITE STRUCTURES EMBEDDED WITH AT LEAST ONE LOAD FITTING AND METHODS OF MANUFACTURING SAME

(71) Applicant: The Boeing Company, Chicago, IL (US)

(72) Inventors: Jeffery Lee Marcoe, Bellevue, WA (US); Marc Rollo Matsen, Seattle, WA (US); Waeil M. Ashmawi, Bellevue, WA (US); Jaime C. Garcia, Kent, WA (US); Sahrudine Apdalhaliem, Seattle, WA (US); John B. Moser, Bonney Lake, WA (US); Brett I. Lyons, Seattle, WA (US); Moushumi Shome, Kent, WA (US); Kay Y. Blohowiak, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 239 days.

(21) Appl. No.: 15/465,029

(22) Filed: Mar. 21, 2017

(65) Prior Publication Data

US 2017/0190137 A1    Jul. 6, 2017

Related U.S. Application Data

(60) Division of application No. 14/465,911, filed on Aug. 22, 2014, now Pat. No. 9,718,248, which is a
(Continued)

(51) Int. Cl.
*B32B 1/08* (2006.01)
*B32B 5/02* (2006.01)
(Continued)

(52) U.S. Cl.
CPC ............. *B32B 1/08* (2013.01); *B29C 33/52* (2013.01); *B29C 70/205* (2013.01);
(Continued)

(58) Field of Classification Search
CPC ....... B32B 2605/18; B32B 1/08; B32B 5/024; B32B 2262/106; B32B 2605/08;
(Continued)

(56) References Cited

U.S. PATENT DOCUMENTS 5,176,868 A    1/1993 Davis
5,409,651 A    4/1995 Head
(Continued)

OTHER PUBLICATIONS

Human translation JP 63-015734; Date: Jan. 22, 1988.*

*Primary Examiner* — Vishal I Patel
(74) *Attorney, Agent, or Firm* — McDonnell Boehnen Hulbert & Berghoff LLP

(57) ABSTRACT

Manufacturing a thermoplastic composite tubular structure embedded with a first load fitting comprising the steps of braiding a first plurality of inner layers of thermoplastic composite material around a soluble, expandable mandrel. A first load fitting is positioned on the first plurality of inner layers of thermoplastic composite material. A second plurality of outer layers of thermoplastic composite material is braided around the first load fitting and the mandrel so as to form an overbraided mandrel embedded with the first load fitting. The overbraided mandrel is installed into a matched tooling assembly and heated at a specified heating profile in order to consolidate the first plurality of inner layers of thermoplastic composite material and the second plurality of outer layers of thermoplastic composite material with the first load fitting so as to form a thermoplastic composite tubular structure embedded with the first load fitting. A second load fitting may be positioned on the first plurality of inner layers of thermoplastic composite material.

20 Claims, 14 Drawing Sheets

Related U.S. Application Data continuation-in-part of application No. 13/650,139, filed on Oct. 12, 2012, now Pat. No. 9,174,393.

(51) Int. Cl.
    *B29C 70/46*     (2006.01)
    *B29C 33/52*     (2006.01)
    *B29C 70/20*     (2006.01)
    *D04C 1/06*     (2006.01)
    *B29C 35/08*     (2006.01)

(52) U.S. Cl.
    CPC ............ *B29C 70/462* (2013.01); *B32B 5/024* (2013.01); *D04C 1/06* (2013.01); *B29C 2035/0811* (2013.01); *B32B 2262/106* (2013.01); *B32B 2605/08* (2013.01); *B32B 2605/12* (2013.01); *B32B 2605/18* (2013.01)

(58) Field of Classification Search
    CPC ..... B32B 2605/12; D04C 1/06; B29C 70/462; B29C 33/52; B29C 70/205; B29C 2035/0811
    See application file for complete search history.

(56) References Cited

U.S. PATENT DOCUMENTS

| | | |
|---|---|---|
| 2011/0281052 A1 | 11/2011 | Dewhirst |
| 2012/0228467 A1 | 9/2012 | Wallen et al. |
| 2013/0075529 A1 | 3/2013 | Marcoe |
| 2014/0102578 A1 | 4/2014 | Bartel et al. |

\* cited by examiner

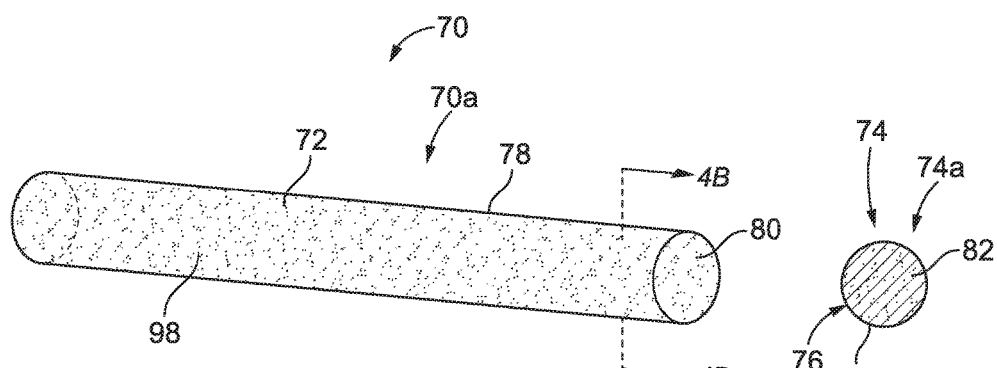
FIG. 4A    FIG. 4B
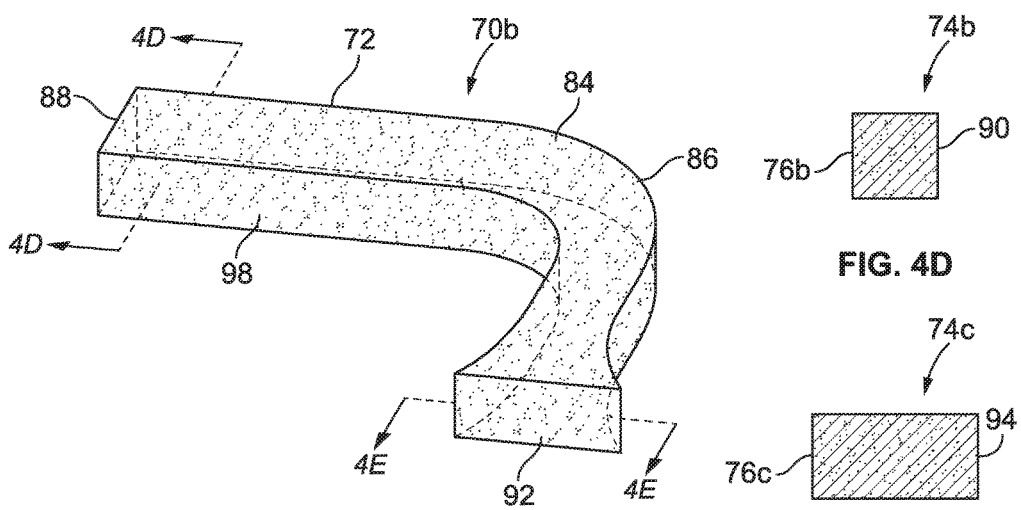
FIG. 4C    FIG. 4D
FIG. 4E

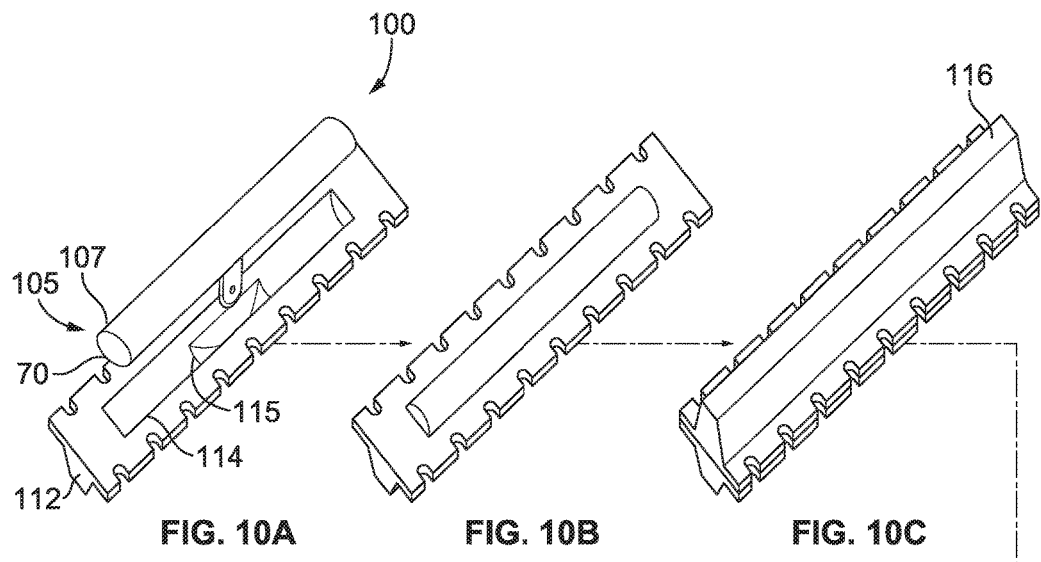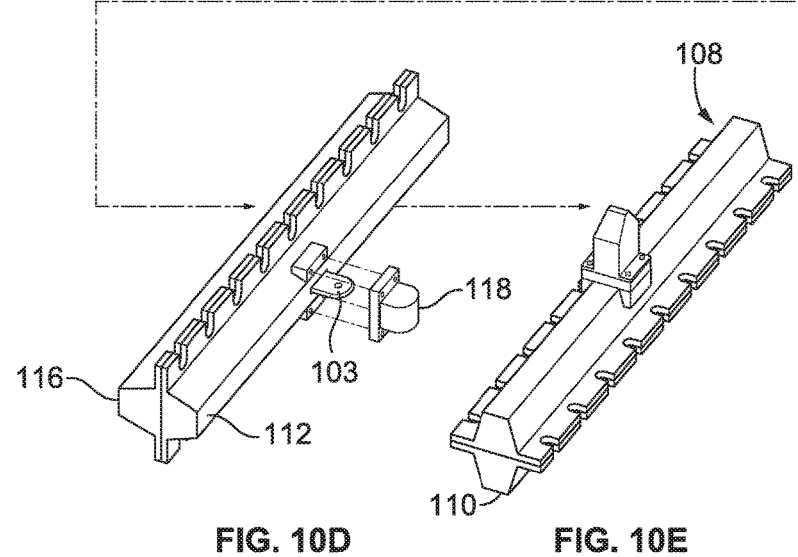

ND METHODS OF
THERMOPLASTIC COMPOSITE STRUCTURES EMBEDDED WITH AT LEAST ONE LOAD FITTING AND METHODS OF MANUFACTURING SAME

CROSS REFERENCE TO RELATED APPLICATIONS

This application is a divisional of U.S. patent application Ser. No. 14/465,911, filed on Aug. 22, 2014, which is a continuation-in-part of U.S. patent application Ser. No. 13/650,139, filed on Oct. 12, 2012, now U.S. Pat. No. 9,174,393. The entire contents, references, and substance of each of the above-referenced patent applications are hereby incorporated by reference as if fully set forth below.

FIELD OF THE INVENTION

The present disclosure relates generally to composite structures embedded with one or more load fittings and methods of manufacturing same. More particularly, the present disclosure is related to thermoplastic composite tubular structures embedded with at least one load fitting and methods of manufacturing the same using soluble, expandable tooling.

BACKGROUND

Thermoplastic and fiber-reinforced thermoplastic composite structures and parts are used in a wide variety of applications, including in the manufacture of aircraft, spacecraft, rotorcraft, watercraft, automobiles, trucks, and other vehicles and structures, due to their high strength-to-weight ratios, corrosion resistance, and other favorable properties. In aircraft manufacturing and assembly, such thermoplastic and fiber-reinforced thermoplastic composite structures and parts are used in increasing quantities to form the fuselage, wings, tail section, skin panels, and other components.

However, the use of thermoplastic composite materials in the design and manufacture of tubular cylindrical and non-cylindrical structures, such as tubes, pipes, ducts, conduits, and elongate hollow components, for use in aircraft, may present certain difficulties. For example, difficulties can arise due to tooling removal, processing temperature, outer surface dimensional tolerances, fiber alignment, and other processing challenges. Although certain known methods may exist for fabricating tubular cylindrical and non-cylindrical structures, such known methods have certain perceived disadvantages. For example, certain known methods may use only discrete load introduction fittings and parts after overbraiding the fabricated tubular cylindrical and non-cylindrical structures. Consequently, such known methods may require a failsafe redundant structure, which may include a primary weld of the fabricated structures. Aside from this primary weld, a wrap of the braided fibers may further be required to manufacture the fabricated tubular cylindrical and non-cylindrical structures with one or more load fittings or load introduction points.

Therefore, manufacturing options for such known methods may result in increased manufacturing time, and in turn, increased manufacturing costs. Further, the failsafe redundant structure typically may result in increased weight of the aircraft, which, in turn, may result in increased fuel costs during aircraft flight.

Accordingly, there is a need for improved thermoplastic composite tubular structures that can be embedded with one or more load fittings. There is also a need for improved methods for manufacturing such thermoplastic composite tubular structures embedded with load fittings that provide advantages over known structures and methods.

SUMMARY

According to an exemplary arrangement, embodiments of the improved thermoplastic composite tubular structures embedded with at least one load fitting and improved methods for manufacturing such thermoplastic composite tubular structures embedded with at least one load fitting is presented.

In one arrangement, a method of manufacturing a thermoplastic composite tubular structure embedded with a first load fitting comprises the step of braiding a first plurality of inner layers of thermoplastic composite material around a mandrel, the mandrel comprising a soluble, expandable material and comprising a mandrel cross-section defining a first closed geometric shape. The method comprises the step of placing a first load fitting on the first plurality of inner layers of thermoplastic composite material and braiding a second plurality of outer layers of thermoplastic composite material around the first load fitting and the mandrel so as to form an overbraided mandrel embedded with the first load fitting.

In another arrangement, the method further comprises the step of installing the overbraided mandrel embedded with the first load fitting into a matched tooling assembly. The method may also include the step of heating in a heating apparatus the matched tooling assembly with the installed overbraided mandrel embedded with the first load fitting member at a specified heating profile in order to consolidate the first plurality of inner layers of thermoplastic composite material and the second plurality of outer layers of thermoplastic composite material with the first load fitting so as to form a thermoplastic composite tubular structure embedded with the first load fitting. In yet another arrangement, the heating apparatus is selected from the group consisting of a convection oven, an induction oven, an autoclave, an induction heated matched tooling assembly, and an integrally heated tooling assembly. In addition, the specified heating profile comprises a heating temperature in a range of from about 150 degrees Fahrenheit to about 800 degrees Fahrenheit and a heating time in a range of from about 5 minutes to about 120 minutes.

In one arrangement, upon heating in the heating apparatus, the expandable material of the mandrel expands and exerts pressure on the plurality of inner and outer layers of thermoplastic composite material against the matched tooling assembly causing consolidation of the plurality of inner and outer layers of thermoplastic composite material with the at least one load fitting.

In one arrangement, the method further comprises the steps of cooling the matched tooling assembly containing the formed thermoplastic composite tubular structure embedded with the first load fitting at a specified cooling profile, and removing the formed thermoplastic composite tubular structure embedded with the first load fitting from the matched tooling assembly.

In one arrangement, the method may further comprise the step of solubilizing the mandrel to remove the mandrel from the formed thermoplastic composite tubular structure embedded with the first load fitting.

In yet another arrangement, the overbraided mandrel embedded with the first load fitting comprises an overbraided mandrel cross-section defining a second closed geometric shape, the second closed geometric shape corresponding to the first closed geometric shape of the mandrel cross-section.

In yet another arrangement, the method includes the steps of braiding the first plurality of inner layers of thermoplastic composite material around the mandrel to define a first inner layer depth and braiding the second plurality of outer layers of thermoplastic composite material around the first load fitting and the mandrel to define a second outer layer depth so as to form an overbraided mandrel embedded with the first load fitting. The first inner layer depth of the first plurality of inner layers of thermoplastic composite material may be the same or may be different than the second outer layer depth of the second plurality of outer layers of thermoplastic composite material.

In yet another arrangement, the method further comprises the steps of placing a second load fitting on the first plurality of inner layers of thermoplastic composite material and braiding the second plurality of outer layers of thermoplastic composite material around the first load fitting, the second load fitting, and the mandrel so as to form an overbraided mandrel embedded with the first and second load fitting.

In one arrangement, the soluble, expandable material of the mandrel is selected from the group consisting of one or more of ceramic, sand, a polymer binder, a soluble organic binder, a soluble inorganic binder, sodium silicate, graphite, one or more additives, and one or more preservatives.

In one arrangement, the first closed geometric shape is selected from the group consisting of a circle, a semi-circle, a rectangle, an oval, an ellipse, a parallelogram, a trapezoid, a rhombus, a curvilinear triangle, a crescent, a quadrilateral, a quatrefoil, and a polygon comprising a triangle, a square, a pentagon, a hexagon, a heptagon, an octagon, a nonagon, a decagon, a hendecagon, and a dodecagon.

In one arrangement, the plurality of inner layers of thermoplastic composite material are materials selected from the group consisting of carbon fiber composite material; carbon fiber reinforced polymer material including carbon fiber reinforced polyphenylene sulfide (PPS), carbon fiber reinforced polyetheretherketone (PEEK), carbon fiber reinforced polyetherketoneketone (PEKK), and carbon fiber reinforced polyetherimide (PEI); and nylon.

In yet another arrangement, the plurality of inner layers of thermoplastic composite material are in a form selected from the group consisting of a continuous slit tape thermoplastic composite material, a prepreg unidirectional tape, a prepreg fabric, a commingled fiber material, and a quasi-isotropic or anisotropic continuous fiber thermoplastic composite material.

In yet another arrangement, the matched tooling assembly comprises a metallic clamshell tooling assembly.

In yet another arrangement, a specified cooling profile comprises a temperature below a glass transition temperature of the plurality of inner and outer layers of thermoplastic composite material forming the overbraided mandrel embedded with the at least one load fitting.

In yet another arrangement, a step of solubilizing the mandrel further comprises solubilizing the mandrel with water or a water-based solution to permanently remove the mandrel from the formed thermoplastic composite tubular structure embedded with the first load fitting.

In yet another arrangement, a step of braiding the plurality of outer layers of thermoplastic composite material around the first load fitting and the mandrel further comprises the step of tailoring a depth of the first load introduction member to a type and magnitude of a load being introduced to the thermoplastic composite tubular structure embedded with the first load fitting.

In yet another arrangement, the first plurality of inner layers comprises a first braided configuration and the second plurality of outer layers comprises a second braided configuration. The first braided configuration may be the same or may be different than the second braided configuration.

In yet another arrangement, a thermoplastic composite tubular structure embedded with a first load fitting, comprises a first plurality of inner layers of thermoplastic composite material braided around a mandrel, the mandrel comprising a soluble, expandable material and comprising a mandrel cross-section defining a first closed geometric shape. A first load fitting is placed on the first plurality of inner layers of thermoplastic composite material and a second plurality of outer layers of thermoplastic composite material braided around the first load fitting and the mandrel so as to form an overbraided mandrel embedded with the first load fitting. The soluble, expandable material of the mandrel may be selected from the group consisting of one or more of ceramic, sand, a polymer binder, a soluble organic binder, a soluble inorganic binder, sodium silicate, graphite, one or more additives, and one or more preservatives. Additionally, the first closed geometric shape may be selected from the group consisting of a circle, a semi-circle, a rectangle, an oval, an ellipse, a parallelogram, a trapezoid, a rhombus, a curvilinear triangle, a crescent, a quadrilateral, a quatrefoil, and a polygon comprising a triangle, a square, a pentagon, a hexagon, a heptagon, an octagon, a nonagon, a decagon, a hendecagon, and a dodecagon.

In another alternative arrangement, the plurality of inner layers of thermoplastic composite material are materials selected from the group consisting of carbon fiber composite material; carbon fiber reinforced polymer material including carbon fiber reinforced polyphenylene sulfide (PPS), carbon fiber reinforced polyetheretherketone (PEEK), carbon fiber reinforced polyetherketoneketone (PEKK), and carbon fiber reinforced polyetherimide (PEI); and nylon. Additionally, the plurality of inner layers of thermoplastic composite material may be in a form selected from the group consisting of a continuous slit tape thermoplastic composite material, a prepreg unidirectional tape, a prepreg fabric, a commingled fiber material, and a quasi-isotropic or anisotropic continuous fiber thermoplastic composite material.

In yet another arrangement, the plurality of outer layers of thermoplastic composite material braided around the first load fitting and the mandrel may be tailored to a depth relating to a type and magnitude of a load being introduced to the thermoplastic composite tubular structure embedded with the first load fitting.

In yet another arrangement, the thermoplastic composite tubular structure may comprise a second load fitting. This second load fitting may be placed on the first plurality of inner layers of thermoplastic composite material.

The features, functions, and advantages can be achieved independently in various embodiments of the present disclosure or may be combined in yet other embodiments in which further details can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 4A is an illustration of a perspective view of one of the embodiments of a mandrel that may be used in method embodiments of the disclosure;

FIG. 4B is an illustration of a cross-sectional view taken along lines 4B-4B of FIG. 4A;

FIG. 4C is an illustration of a perspective view of another one of the embodiments of a mandrel that may be used in method embodiments of the disclosure;

FIG. 4D is an illustration of a cross-sectional view taken along lines 4D-4D of FIG. 4C;

FIG. 4E is an illustration of a cross-sectional view taken along lines 4E-4E of FIG. 4C;

FIGS. 10A-E are illustrations of various process steps of installing an overbraided mandrel embedded with at least one load fitting into a matched tooling assembly that may be used in method embodiments of the disclosure;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
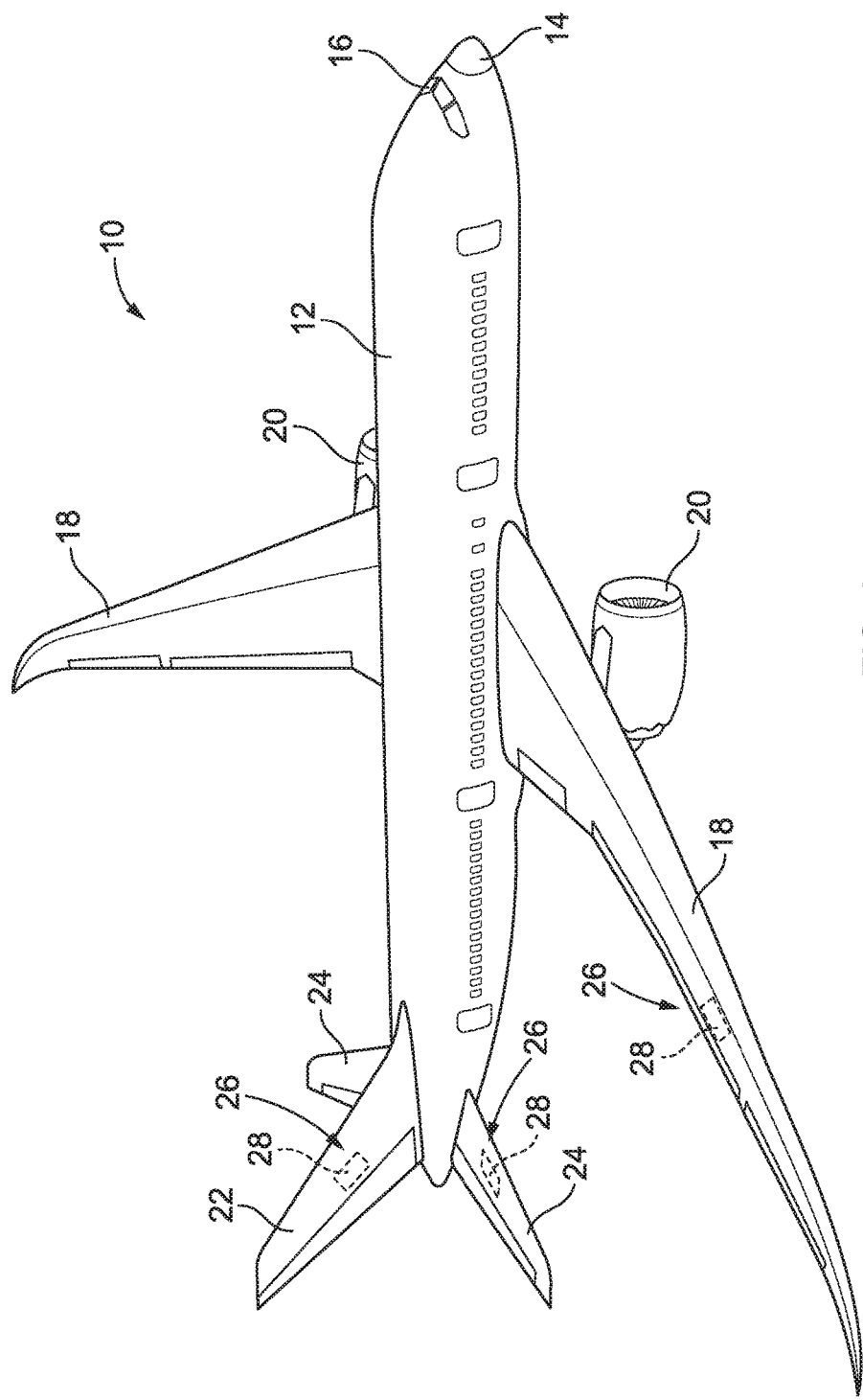
FIG. 1 is an illustration of a perspective view of an aircraft which may incorporate one or more thermoplastic composite tubular structures fabricated by one of the embodiments of a method of the disclosure.

FIG. 1 is an illustration of a perspective view of an aircraft 10 that may incorporate one or more thermoplastic composite tubular structures embedded with at least one load fitting 26 manufactured by one of the embodiments of a method 200 (see FIG. 13), a method 250 (see FIGS. 14A-B), or a method 300 (see FIGS. 15A-B) of the disclosure. As shown in FIG. 1, the aircraft 10 comprises a fuselage 12, a nose 14, a cockpit 16, wings 18 operatively coupled to the fuselage 12, one or more propulsion units 20, a tail vertical stabilizer 22, and one or more tail horizontal stabilizers 24. Although the aircraft 10 shown in FIG. 1 is generally representative of a commercial passenger aircraft, the one or more thermoplastic composite tubular structures embedded with at least one load fitting 26, as disclosed herein, may also be employed in other types of aircraft or air vehicles. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of structures and methods in accordance with the disclosure may be utilized in other transport vehicles, such as boats and other watercraft, trains, automobiles, trucks, buses, or other suitable transport vehicles formed from or utilizing thermoplastic composite tubular structures or parts.

Figure 2:
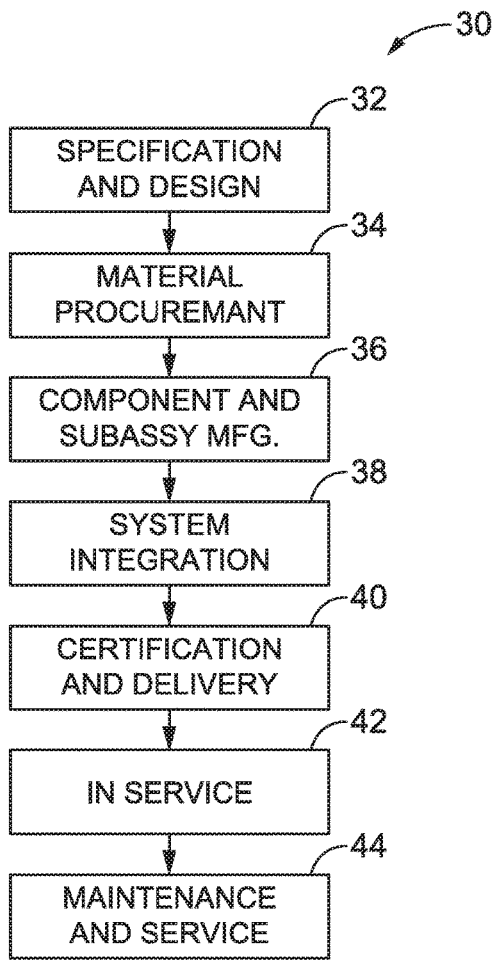
FIG. 2 is an illustration of a flow diagram of an embodiment of an aircraft manufacturing and service method of the disclosure.
Figure 3:
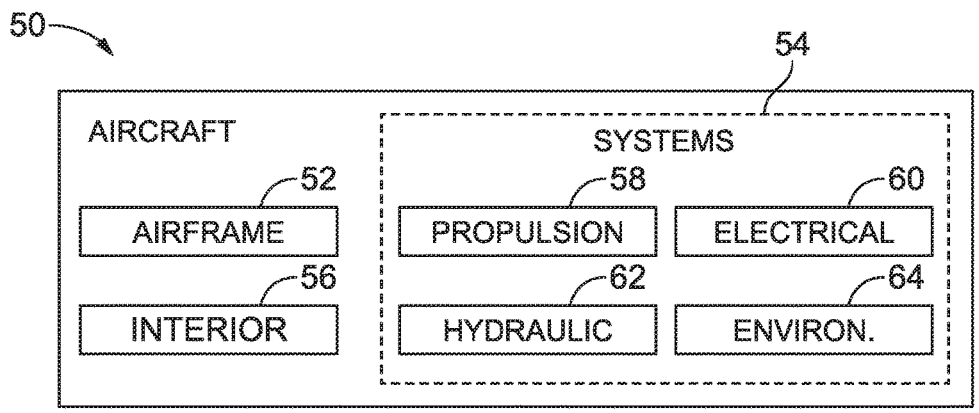
FIG. 3 is an illustration of a functional block diagram of an aircraft.

Embodiments of the disclosure may find use in a variety of potential applications, particularly in the transportation industry, including for example, aerospace, marine, automotive applications and other application where thermoplastic composite tubular structures may be used. Therefore, referring now to FIGS. 2 and 3, embodiments of the disclosure may be used in the context of an aircraft manufacturing and service method 30 as shown in FIG. 2 and an aircraft 50 as shown in FIG. 3. Aircraft applications of the disclosed embodiments may include, for example, without limitation, the design and fabrication of thermoplastic composite tubular structures comprising at least one embedded load fitting. During pre-production, exemplary method 30 may include specification and design 32 of the aircraft 50 and material procurement 34. As just one example, for the specification and design of the aircraft related thermoplastic composite tubular structures, the type and geometrical properties of the thermoplastic composite material making up the first plurality of inner layers and the second plurality of outer layers of the resultant tubular structures may be determined at this step.

As another example, during this specification and design step, in one particular thermoplastic composite tubular structure arrangement, the first plurality of inner thermoplastic composite material 96a (see FIG. 4A), the second plurality of inner thermoplastic composite material 96b, and the load fitting 103 are preferably sized to together carry an ultimate load. In addition, the resulting formed thermoplastic composite tube is preferably designed and therefore sized to carry a limit load. Limit loads are defined as the maximum loads expected in service. For example, Federal Aviation Administration (FAA) Federal Aviation Regulation (FAR) Part 25 specifies that there be no permanent deformation of the structure at limit load. Ultimate loads are defined as the limit loads times a safety factor. FAA FAR Part 25 specifies the safety factor as 1.5. For some research or military aircraft the safety factor may be as low as 1.20.

In addition, during this specification and design step 32 of method 30, the type and composition of the load fitting to be used in a particular thermoplastic composite tubular structure loading application that will be embedded between the first and second layers of thermoplastic materials may be selected. As just another example, the number of load fittings and the orientation and alignment of the load fitting (s) may also be determined during this process step 32. As just one example, the resultant thermoplastic composite tube comprises at least one load fitting that is consolidated between the first plurality of inner layers of thermoplastic material 96a and the second plurality of outer layers of thermoplastic material 96b. In one arrangement, the inner and outer layers of the thermoplastic tube are configured to provide reinforcement and impact damage resistance to the load fitting 103 that comprises a main body 155 and a male clevis portion 170 (see e.g., FIG. 6) in order to prevent a loss in structural loading capability.

During production, component and subassembly manufacturing 36 and system integration 38 of the aircraft 50 takes place. As will be explained in greater detail, FIGS. 12, 13, 14A-B, illustrate three type process steps for fabricating thermoplastic composite tubule structures with at least one load fitting in accordance with the present disclosure. After such a component and subassembly manufacturing step, the aircraft 50 may go through certification and delivery 40 in order to be placed in service 42. While in service by a customer, the aircraft 50 is scheduled for routine maintenance and service 44, which may also include modification, reconfiguration, refurbishment, and so on.

Each of the process steps of method 50 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 3, the aircraft 50 produced by exemplary method 30 may include an airframe 52 with a plurality of high-level systems 54 and an interior 56. Examples of high-level systems 54 may include one or more of a propulsion system 58, an electrical system 60, a hydraulic system 62, and an environmental system 64. Any number of other systems may be included. Although an aerospace example is shown, the principles of the disclosure may be applied to other industries, such as the marine and automotive industries.

Systems and methods embodied herein may be employed during any one or more of the stages of the production and service method 30. For example, components or subassemblies corresponding to production process may be fabricated or manufactured in a manner similar to components or subassemblies produced while the aircraft 50 is in service. Also, one or more apparatus embodiments, method embodiments, or a combination thereof may be utilized during the production stages 32 and 34, for example, by substantially expediting assembly of or reducing the cost of an aircraft 50. Similarly, one or more of apparatus embodiments, method embodiments, or a combination thereof may be utilized while the aircraft 50 is in service, for example and without limitation, to maintenance and service 44.

Figure 13:
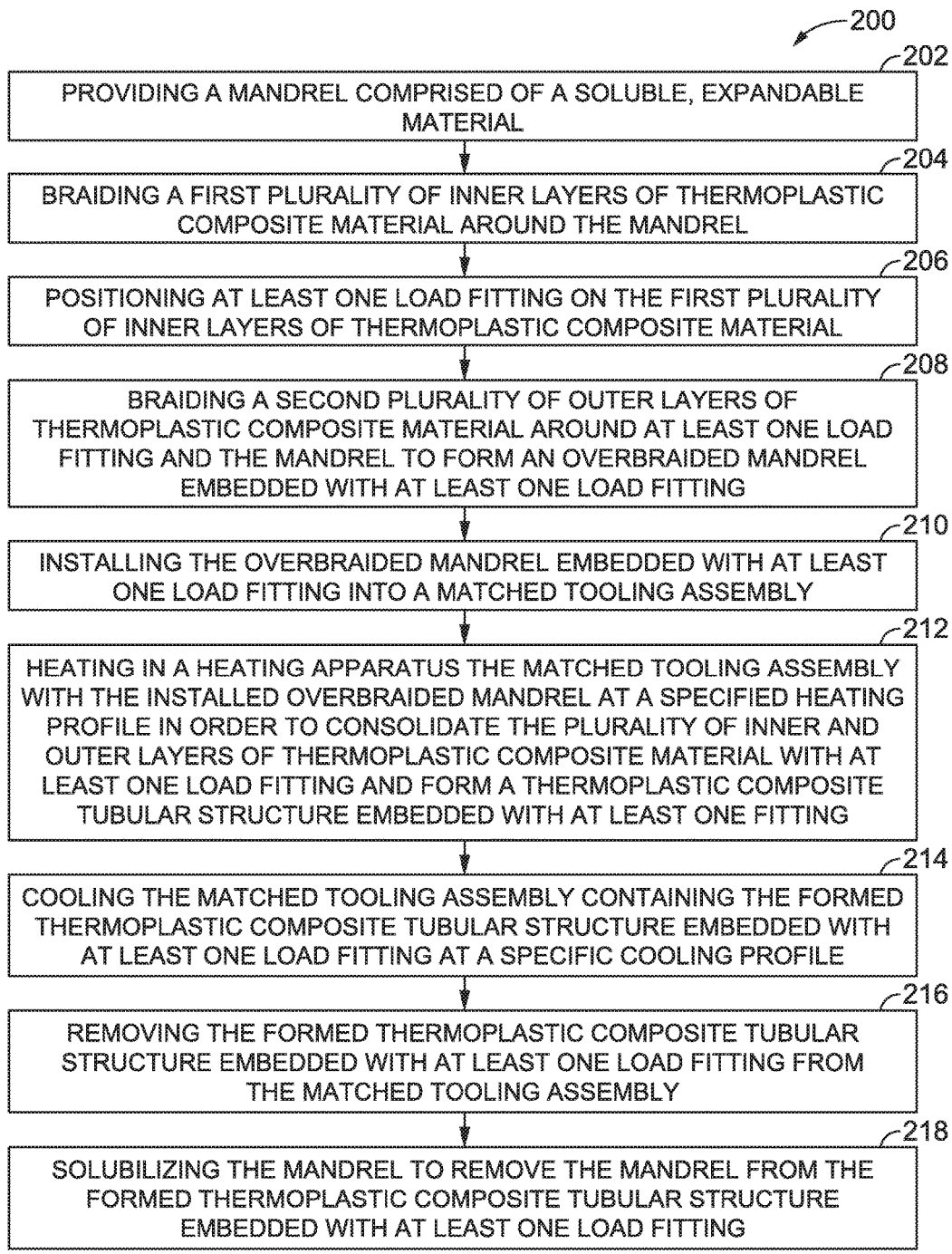
FIG. 13 is an illustration of a flow diagram illustrating one of the embodiments of a method of the disclosure.

In one embodiment of the disclosure, there is provided a method 200 of manufacturing a thermoplastic composite tubular structure embedded with at least one load fitting, such as the thermoplastic composite tubular structures 26 illustrated in FIG. 1. For example, FIG. 13 is an illustration of a flow diagram illustrating a method 200 of the disclosure. For purposes of this patent disclosure, the term "tubular structure" means a structure having a cylindrical or non-cylindrical shape, having a linear or non-linear shape in a lengthwise direction, and having a cross-section defining a closed geometric shape (discussed in detail below). The tubular structure may or may not be hollow or may be partially hollow.

As shown in FIG. 13, the method 200 comprises step 202 of providing a mandrel 70 or tooling (see FIG. 4A) comprised of a soluble, expandable material 72 (see FIGS. 4A, 4C). For example, FIG. 4A is an illustration of a perspective view of one of the embodiments of the mandrel 70, such as in the form of mandrel 70a. Such a mandrel 70a may be used in the method 200 (as well as in method 250 (see FIGS. 14A-B) and method 300 (see FIGS. 15A-B)), of the disclosure. FIG. 4C is an illustration of a perspective view of another one of the embodiments of a mandrel 70b that may be used in the method 200 of the disclosure. The mandrel 70 may therefore, for example, be in the form of mandrel 70a (see FIG. 4A) or mandrel 70b (see FIG. 4C), or another suitable mandrel form.

The mandrel 70 preferably comprises one or more soluble, expandable materials. Such materials may consist of ceramic, sand, a polymer binder, a soluble organic binder, a soluble inorganic binder, sodium silicate, graphite, one or more additives, and one or more preservatives, or another suitable soluble, expandable material. Preferably, the mandrel material is a high expansion material. Embodiments of the mandrel or mandrel materials that may be used in the presently disclosed methods include the mandrel and mandrel materials disclosed in U.S. patent application Ser. No. 13/650,139 entitled "Thermoplastic Composite Tubular Structures using Soluble High Expansion Tooling Materials," herein entirely incorporated by reference and to which the reader is directed for further information.

Preferably, the mandrel 70 comprises a mandrel cross-section 74 defining a first closed geometric shape 76. For example, FIG. 4B is an illustration of a cross-sectional view taken along lines 4B-4B of the mandrel 70 illustrated in FIG. 4A. As shown in FIG. 4A, the mandrel 70, such as in the form of mandrel 70a, may comprise a cylindrical or tubular mandrel 78 having a linear shape 80 and a generally smooth external surface 98. As illustrated in FIG. 4B, the tubular mandrel 78 has the mandrel cross-section 74, such as in the form of a mandrel cross-section 74a, defining the first closed geometric shape 76, such as a first closed geometric shape 76a, in the shape of a circle 82.

As shown in FIG. 4C, the mandrel 70b comprises a non-cylindrical mandrel 84 having a non-linear shape 86. FIG. 4D is an illustration of a cross-sectional view taken along lines 4D-4D of FIG. 4C. The non-cylindrical mandrel 84 has the mandrel cross-section 74, such as in the form of cross-section 74b (see FIG. 4D), defining the first closed geometric shape 76 at a first end 88 (see FIG. 4C), such as a first closed geometric shape 76b (see FIG. 4D), in the shape of a square 90 (see FIG. 4D). FIG. 4E is an illustration of a cross-sectional view taken along lines 4E-4E of FIG. 4C. As can be seen from FIG. 4E, the non-cylindrical mandrel 84 has the mandrel cross-section 74, such as in the form of cross-section 74c, defining the first closed geometric shape 76 at a second end 92 (see FIG. 4C), such as a first closed geometric shape 76c, in the shape of a rectangle 94 (see FIG. 4E).

In addition to the shapes of the circle 82 and the rectangle 94 as illustrated in FIGS. 4B and 4E, the first closed geometric shape 76 may further include such shapes as a semi-circle, an oval, an ellipse, a parallelogram, a trapezoid, a rhombus, a curvilinear triangle, a crescent, a quadrilateral, a quatrefoil, and polygon shapes, in addition to the square 90 (see FIG. 4D), comprising a triangle, a pentagon, a hexagon, a heptagon, an octagon, a nonagon, a decagon, a hendecagon, a dodecagon, or another suitable closed geometric shape.

Returning to FIG. 13, the method 200 further comprises an initial step 204 of braiding a first plurality of inner layers of thermoplastic composite material 96a around the mandrel 70 over an exterior surface 98 (see FIG. 5) of the mandrel 70, such as in the form of the tubular mandrel 78. In one preferred arrangement, and as will be described in greater detail herein, the method 200 may comprise the step of braiding the first plurality of inner layers of thermoplastic composite material around the external surface of the mandrel so as to define a first inner layer depth. Preferably, this first inner layer depth may be determined during the specification and design step 32 as described with respect to FIG. 1. In one arrangement, this first inner layer depth may be defined in part by the loading characteristics of the subsequently manufactured thermoplastic composite tubular structure.

Figure 7:
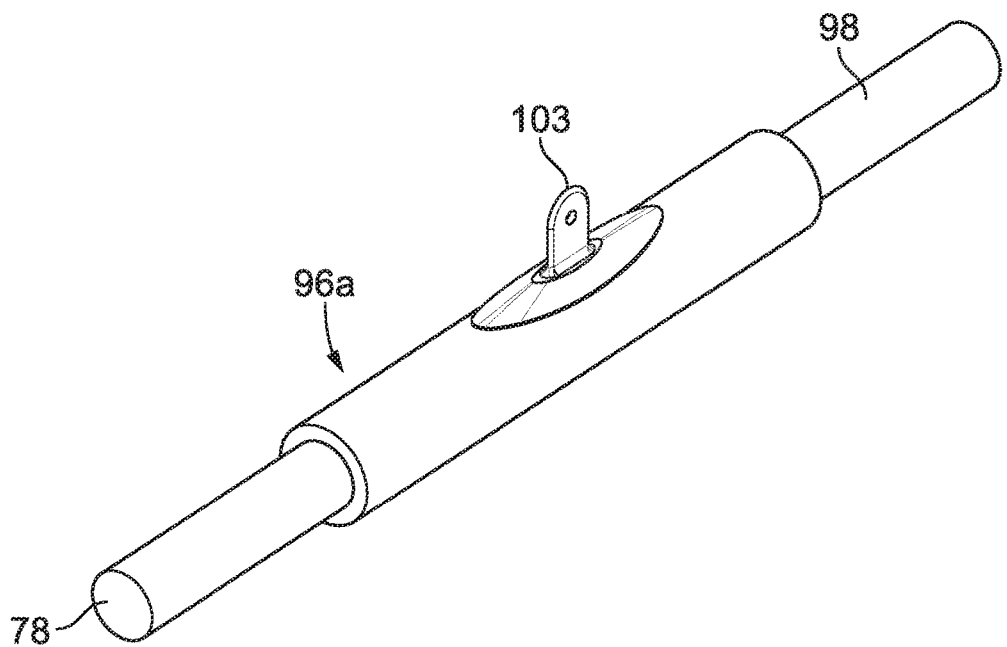
FIG. 7 is an illustration of positioning at least one load fitting that may be used in method embodiments of the disclosure.

Returning to the method 200 illustrated in FIG. 13, step 206 illustrates the step of positioning at least one load fitting 103 on the first plurality of inner layers of thermoplastic composite material 96a (see FIG. 7). During this step, or perhaps after subsequent braiding steps, a second load fitting may be positioned on the partially braided mandrel 70. Then, the method continues to step 208 which includes the step of braiding a second plurality of outer layers of thermoplastic composite material 96b around the mandrel 70 and the at least one load fitting 103 so as to form an overbraided mandrel embedded with the at least one load fitting 100 (see FIG. 8A).

In one preferred arrangement, braiding of the second plurality of outer layers of thermoplastic composite material around the at least one load fitting defines a second outer layer depth of composite material. Preferably, this second outer layer depth may be determined during the specification and design step 32 as described with respect to FIG. 1. In one arrangement, this second outer layer depth may be defined in part by the loading characteristics of the subsequently manufactured thermoplastic composite structure.

The use of the first plurality of inner layers of thermoplastic composite material 96a and the second plurality of outer layers of thermoplastic composite material 96b allows for preferred configurations or designs of the thermoplastic composite tubular structures embedded with at least one load fitting 26 to be fabricated due to its ability to form structures in more complicated shapes. Additionally, the use of the first plurality of inner layers of thermoplastic composite material 96a and second plurality of outer layers of thermoplastic composite material 96b may allow an axial position or axial depth of a load fitting within the thermoplastic composite tubular structure to be varied or tailored to the type and magnitude of the load being introduced to the thermoplastic composite tubular structures.

Figure 8A:
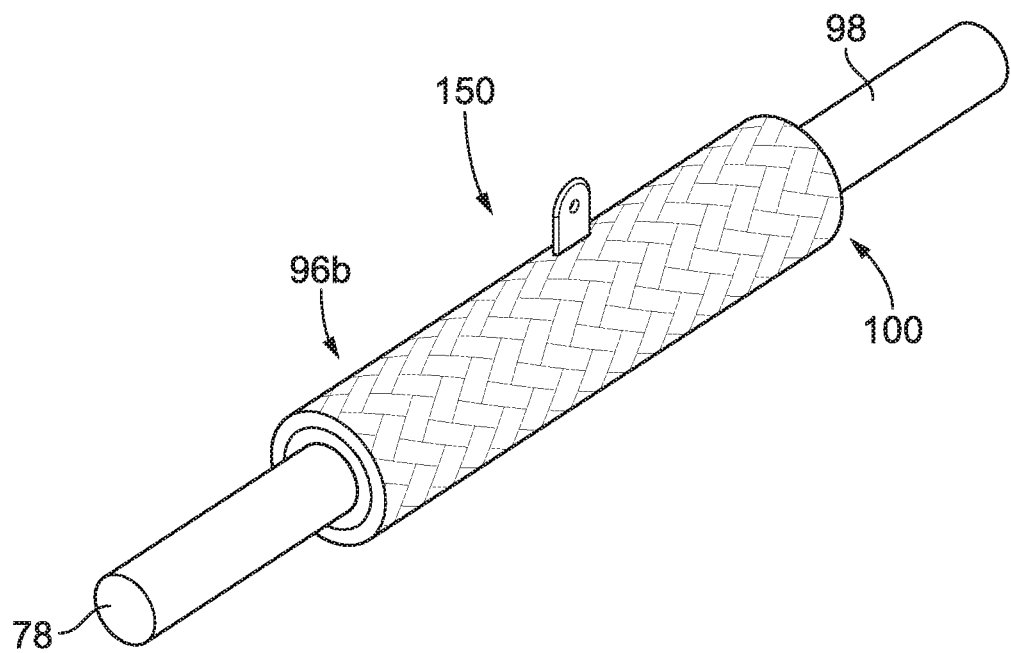
FIG. 8A is an illustration of an overbraided mandrel embedded with at least one load fitting that may be used in method embodiments of the disclosure.
Figure 8B:
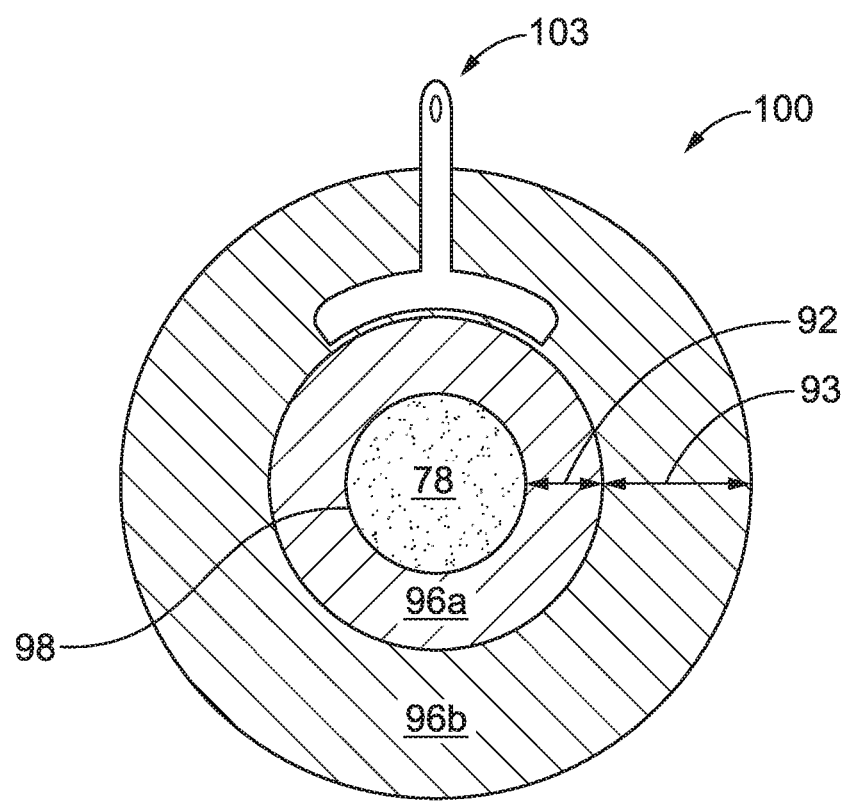
FIG. 8B is cross-sectional illustration of the overbraided mandrel embedded with the at least one load fitting illustrated in FIG. 8A.

For example, FIG. 8B provides a cross sectional illustration of the braided mandrel 100 illustrated in FIG. 8A. As illustrated in FIG. 8B, the first plurality of inner layers of thermoplastic composite material 96a has been braided around the mandrel 78 where the first plurality of inner layers define a first inner layer depth $D_{Inner}$ 92. As those of ordinary skill in the art will recognize, if more layers of thermoplastic composite material 96a are braided onto the outer surface of the mandrel 78, the first inner layer depth $D_{Inner}$ 92 would increase. As also illustrated, the load fitting 103 is provided in a seated position on top of this first inner layer and is therefore provided at a depth $D_{Inner}$ 92 from the outer surface 98 of the mandrel 78. In this illustrated arrangement, a curvature of the bottom surface of the load fitting 103 generally corresponds with a radius of curvature of the first plurality of inner layers 96a.

In a subsequent process step, the second plurality of outer layers of thermoplastic composite material 96b is braided around the now positioned first load fitting 103, the mandrel 78, and the first plurality of inner layers 96a. The amount of the second plurality of outer layers 96b defines a second outer layer depth $D_{Outer}$ 93 that now forms an overbraided mandrel 100. As illustrated, the first inner layer depth of the first plurality of inner layers of thermoplastic composite material $D_{Inner}$ 92 is different than the second outer layer depth of the second plurality of outer layers of thermoplastic composite material $D_{Outer}$ 93. However, as those of skill in the art will recognize, different overbraided mandrel configurations comprising alternative first inner layer depth and second outer layer depth configurations may also be utilized.

In a preferred arrangement, the inner and outer thermoplastic materials 96a, 96b, respectively, may comprise slit tape thermoplastic materials. The utilization of slit tape thermoplastic material for the inner and outer thermoplastic materials may provide certain advantages, such as decreased tape crossover and kinking. Specifically, the first plurality of inner layers of thermoplastic composite material 96a preferably consists of a carbon fiber composite material; carbon fiber reinforced polymer material including carbon fiber reinforced polypheylene sulfide (PPS), carbon fiber reinforced polyetheretherketone (PEEK), carbon fiber reinforced polyetherketoneketone (PEKK), and carbon fiber reinforced polyetherimide (PEI); nylon, or another suitable thermoplastic composite material. One advantage of using such thermoplastic materials is that they allow for co-consolidation of the inner and outer thermoplastic materials to the load fitting 103. In addition, such the thermoplastic materials for potential welding of support or systems brackets to the resulting thermoplastic composite tubular structure 132. (see, FIG. 12).

The plurality of inner layers of thermoplastic composite material 96a and plurality of outer layers of thermoplastic composite material 96b are preferably in a form consisting of a continuous slit tape thermoplastic composite material, a prepreg unidirectional tape, a prepreg fabric, a commingled fiber material, a quasi-isotropic or anisotropic continuous fiber thermoplastic composite material, or another suitable continuous fiber thermoplastic composite material.

In one arrangement, the second plurality of outer layers of thermoplastic composite material 96b may comprise the same type of material as the first plurality of inner layers of thermoplastic composite material 96a. Alternatively, the second plurality of outer layers of thermoplastic composite material 96b may comprise a different material as the first plurality of inner layers 96a.

Preferably, the first plurality of inner layers of thermoplastic composite material 96a comprises a form of prepreg unidirectional tape 106, such as a narrow width of ⅛ inch wide, ¼ inch wide, or another suitably narrow width tape. The commingled fiber material may comprise dry fibers with a thermoplastic resin powder embedded in the dry fibers. In one preferred arrangement, the second plurality of outer layers of thermoplastic composite material 96b may comprise a similar width or a different width as the first plurality of inner layers of thermoplastic composite material 96a.

The plurality of inner layers of thermoplastic composite material 96a may be wound and/or braided around the mandrel in a zero (0) degree direction and also wound or braided in a bias direction. When the plurality of inner layers of thermoplastic composite material 96a and plurality of outer layers of thermoplastic composite material 96b are wound or braided in a bias direction, the commingled fiber material may be used so that when the plurality of inner layers of thermoplastic composite material 96a and plurality of outer layers of thermoplastic composite material 96b are heated and consolidated, the embedded resin powder fills the dry fibers and melts to result in the consolidated thermoplastic composite tubular structure embedded with at least one load introduction point 26. In one preferred arrangement, the second plurality of outer layers of thermoplastic composite material 96b may be wound in a similar or perhaps in a different manner than the first plurality of inner layers of the thermoplastic composite material 96a.

For purposes of this patent disclosure, "quasi-isotropic continuous fiber thermoplastic composite material" means a laminate that approximates isotropy by orientation of tows in several or more directions in-plane. For example, a quasi-isotropic part may have randomly oriented fibers in all directions or may have fibers oriented such that equal strength is developed all around the plane of the part. In general, a quasi-isotropic laminate made from a prepreg fabric or woven fabric may have tows oriented at 0° (zero degrees), 90°, +45°, and −45°, with at least 12.5% of the tows in each of these four directions. Quasi-isotropic properties may also be obtained with braided unidirectional (0 degree) and 60 degree bias oriented tows. For purposes of this disclosure, "anisotropic continuous fiber thermoplastic composite material" means the composite material's directional dependence of a physical property and can be a difference, when measured along different axes, in a material's physical or mechanical properties (absorbance, refractive index, conductivity, tensile strength, etc.). Anisotropic may also be referred to as "unidirectional".

Figure 14A:
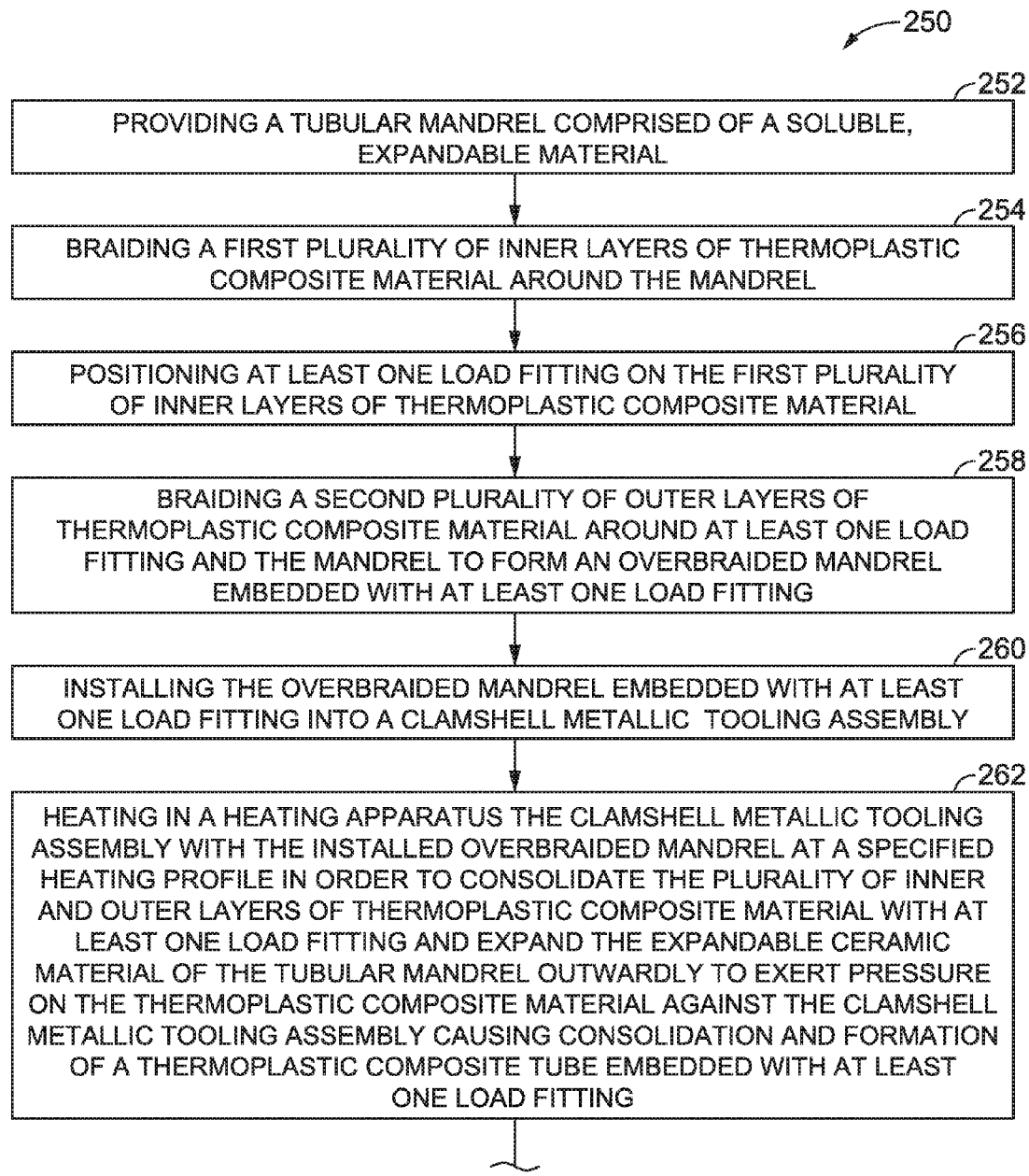
FIGS. 14A-B are an illustration of a flow diagram illustrating another one of the embodiments of a method of the disclosure; and, FIGS. 15A-B are an illustration of a flow diagram illustrating another one of the embodiments of a method of the disclosure.
Figure 14B:
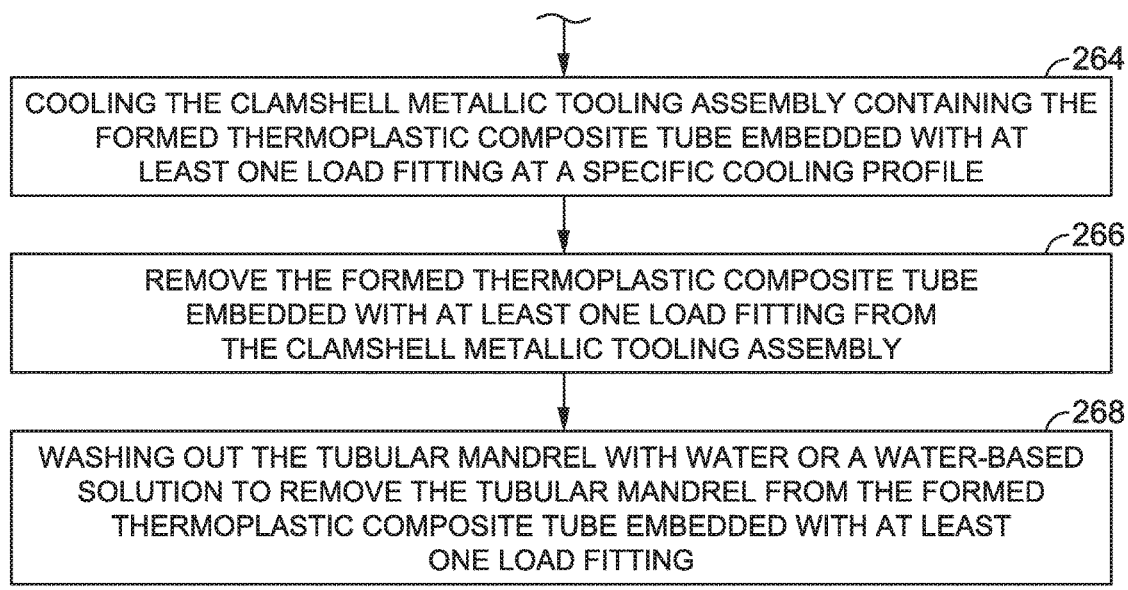
Figure 15A:
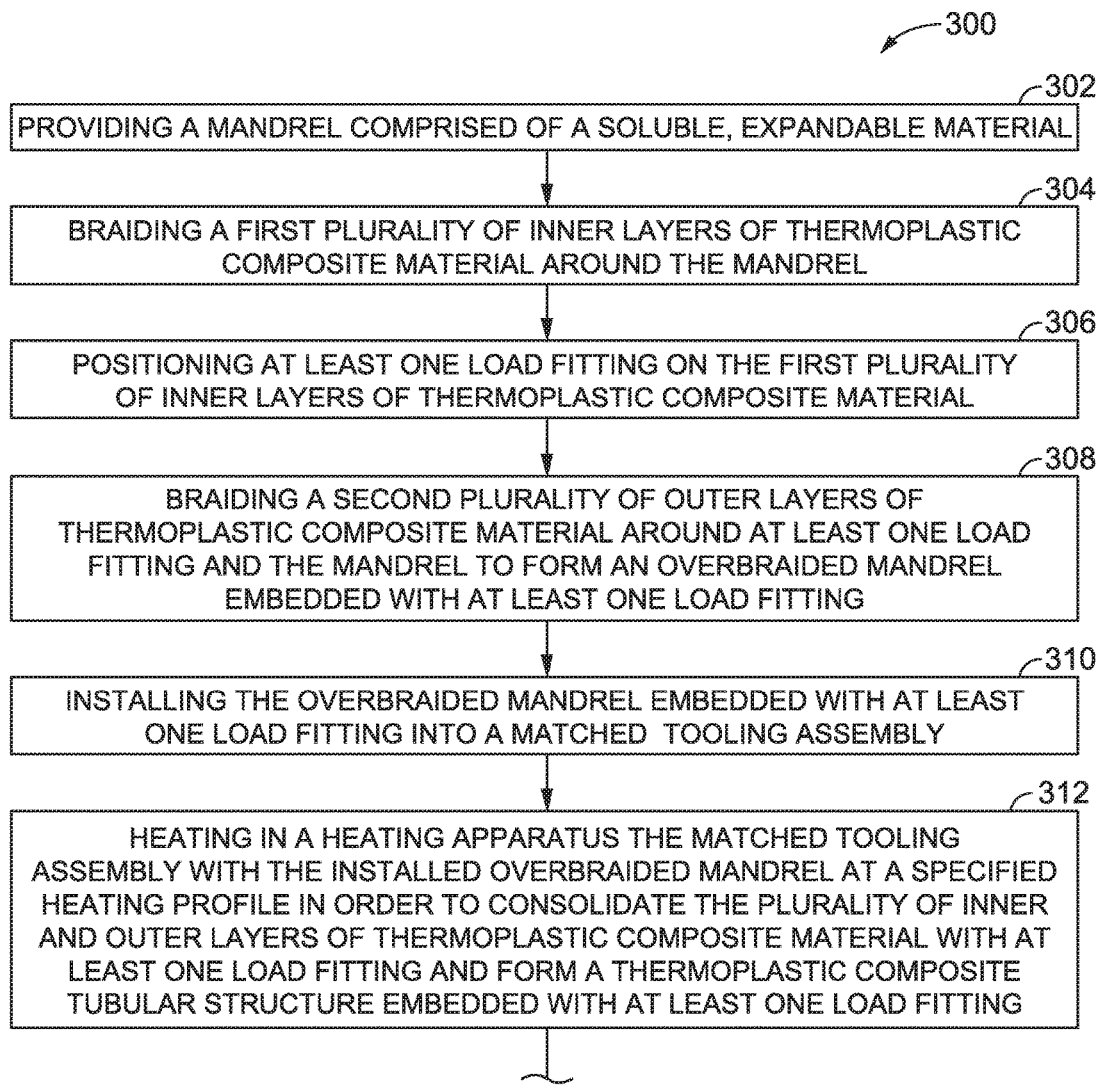
Figure 15B:
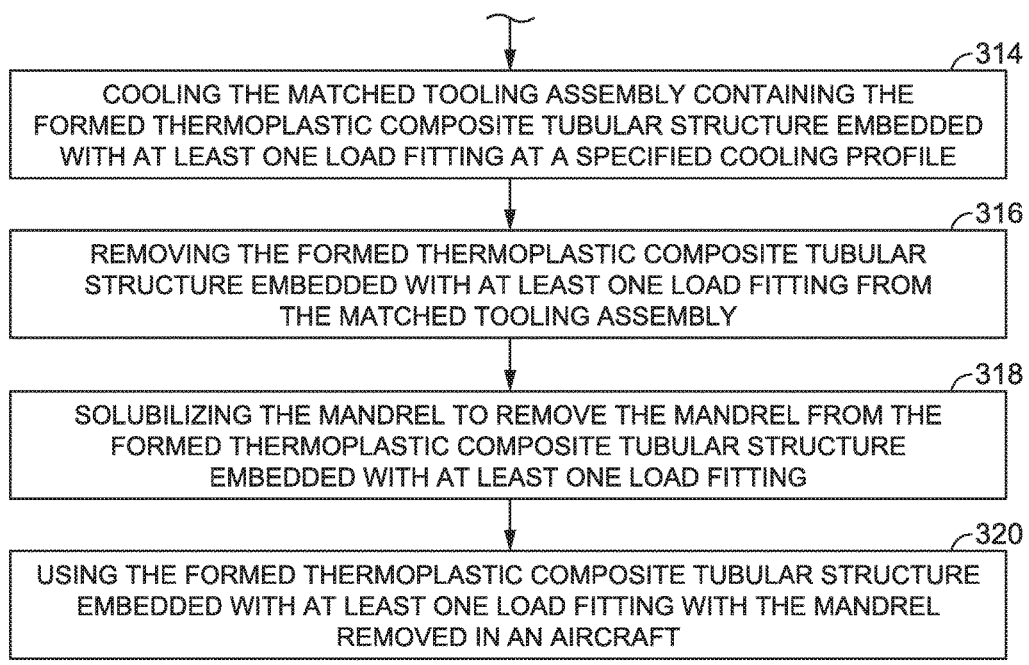

Returning to the method 200 in FIG. 13, as well as method 250 illustrated in FIGS. 14A-B and method 300 illustrated in FIGS. 15A-B, method 200 provides for fabricating and configuration of highly loaded quasi-isotropic or highly loaded anisotropic (unidirectional) thermoplastic composite continuous fiber tubular structures embedded with at least one load fitting with the use of soluble, expandable (high expansion) mandrels or tooling materials.

Figure 5:
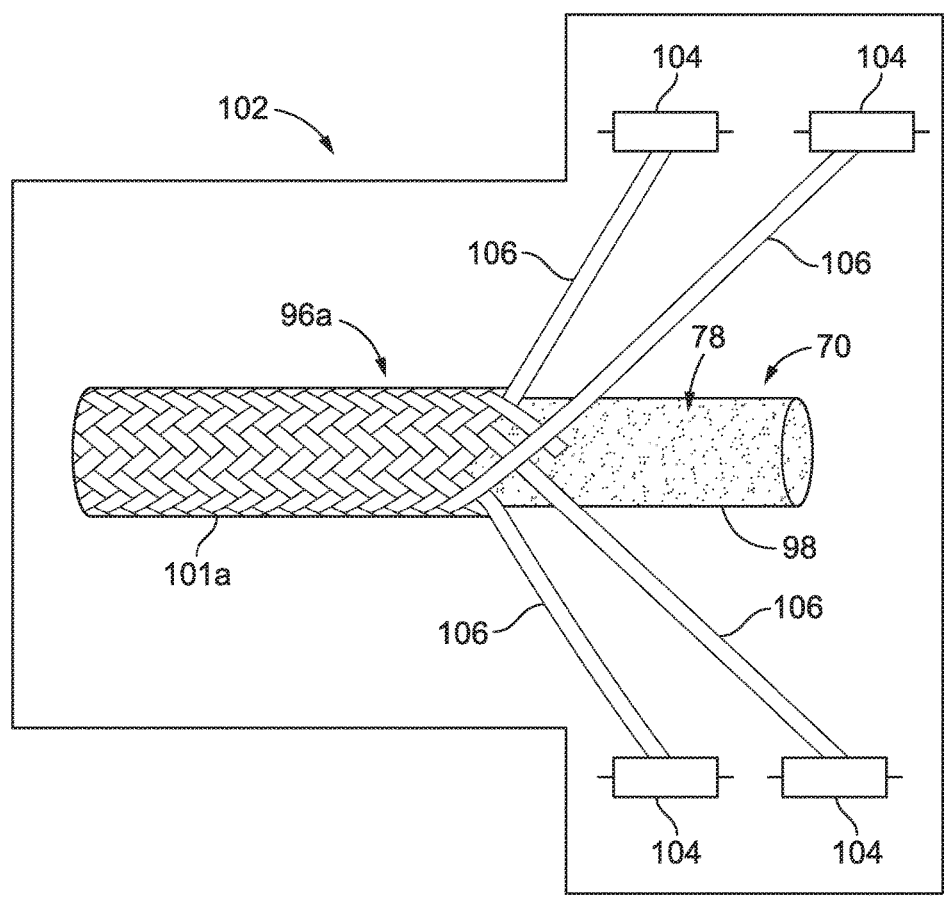
FIG. 5 is an illustration of a schematic view of a braiding apparatus overbraiding one of the embodiments of a mandrel with a first plurality of inner layers of thermoplastic composite material that may be used in method embodiments of the disclosure.

FIG. 5 is an illustration of a schematic top view of a braiding apparatus 102 that may be used for overbraiding one of the embodiments of a mandrel 70 with a first plurality of inner layers of thermoplastic composite material 96a and that may be used in method embodiments of the disclosure. As shown in FIG. 5, the overbraiding of the mandrel 70 is preferably accomplished by using the braiding apparatus 102 having one or more braiding bobbins or tubes 104 for dispensing and braiding the plurality of inner layers of thermoplastic composite material 96a over the mandrel 70. In one preferred arrangement, the first plurality of inner layers comprise a first braided configuration defining a first inner layer depth $D_{Inner}$ 92 of the thermoplastic composite material 96a. A braiding apparatus or machine known in the art may be used to overbraid the mandrel 70.

After the first braided configuration of the thermoplastic composite material 96a has been braided along the outer surface 98 of the mandrel 70 so as to define the first inner layer depth, a load fitting may be placed on the mandrel. As just one example, such a load fitting may comprise a saddle or hyperbolic paraboloid shaped load fitting.

Figure 6:
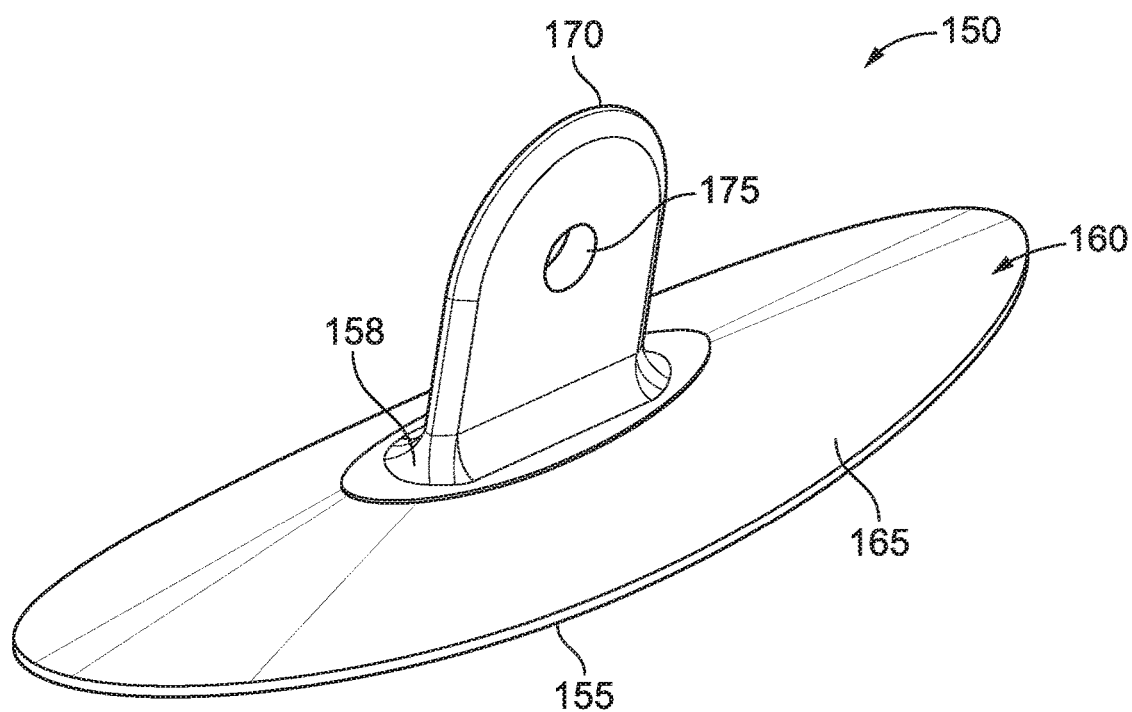
FIG. 6 is an illustration of one arrangement of a load fitting that can be positioned on the first plurality of inner layers of thermoplastic composite material illustrated in FIG. 5.

For example, FIG. 6 illustrates a perspective view of one arrangement of a load fitting 150 that may be used with the partially overbraided mandrel 70 illustrated in FIG. 5. In this load fitting arrangement, the load fitting 150 may take the form of a saddle shaped load fitting. As illustrated, the load fitting 150 comprises a main body 155 generally comprising an oval, elongated shape and comprising an upper surface 160 and a lower surface 165. The lower surface 160 comprises a bearing surface for residing on top the first plurality thermoplastic composite material 96a. The upper surface 160 of the main body 155 of the load fitting 150 comprises a male clevis 170. This male clevis 170 is configured to extend from a central portion 158 of the main body 155. In this illustrated arrangement, the male clevis 170 defines an opening 175. Such an opening 175 may be used to receive a bolt or other like attachment element. In one preferred arrangement, the main body 155 defines a radius of curvature generally equivalent to an outer curvature of the mandrel 70 and the first plurality of inner layers of thermoplastic composite materials 96a illustrated in FIG. 5.

The composition and geometrical shape of the load fitting 150 illustrated in FIG. 6 may be defined during the specification and design step 32 of the method 30 illustrated in FIG. 2. For example, during this specification and design step 32, it may be determined that the load fitting 150 comprise a metallic material such as titanium, carbon composite, aluminum, stainless steel, or other suitable material. In one preferred arrangement, the load fitting 150 comprises a unitary titanium fitting. Prior to placing the load fitting 150 on the mandrel comprising the first plurality of inner layers of thermoplastic, the bottom and top surfaces or the load bearing surface of the load fitting 150 may be prepared or treated. Such load bearing surface preparation may include the steps of cleaning and mechanical pretreatment, application of an adhesion promoter, or application of a polyimide based primer.

As shown in FIG. 7, at least one load fitting 103 (such as the saddle shaped load fitting 150 illustrated in FIG. 6) is positioned on the plurality of inner layers of thermoplastic composite material 96a which have been braided along the mandrel outer surface. Where more than one load fitting 103 is positioned along the inner layers of composite material 96a, the process may also require that these fittings 103 (and particularly the male clevis of these fittings) are aligned with one another over the length of the braided structure. Alternatively, where more than one load fitting is utilized, these fittings (and therefore the male clevis of these fittings) may be offset from one another. In one preferred arrangement, the second plurality of inner layer of composite materials comprise a second braided configuration defining a second depth of the thermoplastic composite material 96b.

Overbraiding of the load fitting 103 and the inner layers of the composite material 96a is preferably accomplished by using the same braiding apparatus 102 having one or more braiding bobbins or tubes 104 (see FIG. 5) for dispensing and braiding the plurality of outer layers of thermoplastic composite material 96b over the mandrel 70 and at least one load fitting 103. This overbraiding forms an over braided mandrel embedded with at least one saddle-based load fitting 100 as illustrated in FIG. 8A. Preferably, the known braiding apparatus or machine has the capability of accommodating changes to the thermoplastic composite material's thickness, gauge, bias angle along the length, cross-sectional shape, cross-sectional angular path along the length, curve, shape of drop, and number of tows. Preferably, the overbraiding of the mandrel 70 and the load fitting 103 is carried out at ambient temperature.

The overbraiding process preferably provides for improved damage tolerance and improved fracture toughness properties of the plurality of inner layers of thermoplastic composite material 96a and plurality of outer layers of thermoplastic composite material 96b due to the over and under construction of the overbraiding process. In one embodiment, the overbraided mandrel embedded with the load fitting 100 as illustrated in FIG. 8A may comprise a plurality of inner layers of thermoplastic composite material 96a and plurality of outer layers of thermoplastic composite material 96b with a bias tow only overbraid 101a.

As discussed above, in one preferred arrangement, the first plurality of inner layers may comprise a first braided configuration and this first braided configuration defines a first depth of the thermoplastic composite material 96a. Similarly, the second plurality of inner layers may comprise a second braided configuration defining a second depth of the thermoplastic composite material 96b. The first braided configuration may be the same as or may be different from the second braided configuration.

Figure 9A:
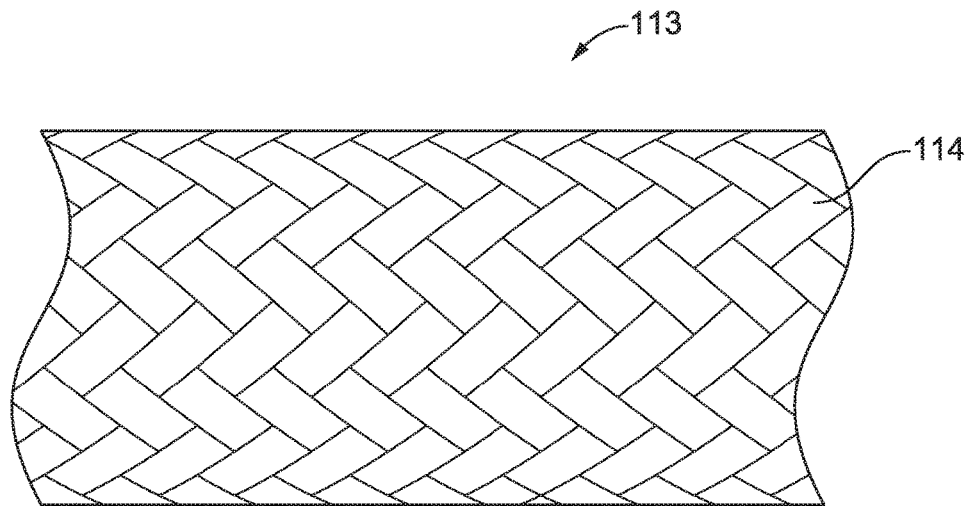
FIG. 9A is an illustration of a close-up top view of an overbraided mandrel having a first braided configuration that may be used in method embodiments of the disclosure.
Figure 9B:
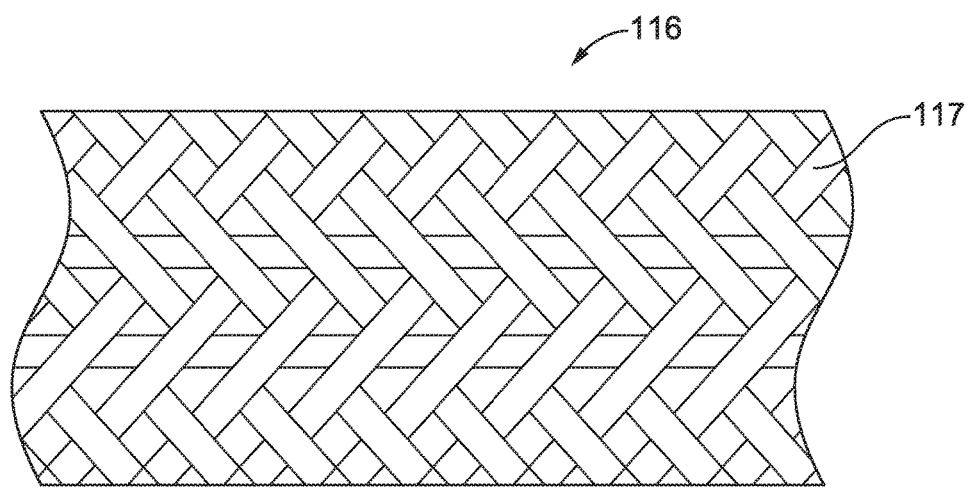
FIG. 9B is an illustration of a close-up top view of an overbraided mandrel having an alternative braided configuration that may be used in method embodiments of the disclosure.

For example, FIG. 9A illustrates a braided configuration 113 comprising a biaxial braided configuration 114. FIG. 9B illustrates a braided configuration 116 that is different than the biaxial braided configuration 114 illustrated in FIG. 9A. Specifically, this alternative braided configuration 116 illustrated in FIG. 9B comprises a triaxial braided configuration 117. Preferably, in one arrangement, the first braided configuration of the inner layers of the thermoplastic composite material 96a and the second braided configuration of the outer layers of the thermoplastic composite material 96b both comprise either a biaxial braided configuration or a triaxial braided configuration as illustrated in FIG. 8A. In another embodiment, the first braided configuration of the inner braided thermoplastic comprises a biaxial braided configuration 114 and the second braided configuration of the outer braided thermoplastic tube 96b comprises a triaxial braided configuration 117 as illustrated in FIG. 8B. As those of skill will recognize, alternative first and second braiding configurations may also be used.

As shown in FIG. 13, the method 200 further comprises step 210 of installing the overbraided mandrel embedded with at least one load fitting 100 into a matched tooling assembly 108. For example, FIG. 10A is an illustration of step 210 of installing the overbraided mandrel embedded with at least one load fitting 100 into the matched tooling assembly 108 which may be used in embodiments of the method 200 (as well as in method 250 (see FIGS. 14A-B) and method 300 (see FIGS. 15A-B)), of the disclosure. The matched tooling assembly 108 preferably comprises a metallic clamshell tooling assembly 110 and at least one load fitting lid 118 made from material, such as steel, stainless steel, or another suitable metal.

FIGS. 10B-E illustrate further processing steps of the overbraided mandrel with embedded load fitting 100 illustrated in FIG. 8. For example, and as shown in FIG. 10A, the matched tooling assembly 108 preferably comprises a tooling assembly first portion 112. This first portion 112 comprises a first portion mold side 114 and at least one load fitting mold side 115 and comprises a second portion 116 having a second portion mold side (not shown) similar to the first portion mold side 114. The overbraided mandrel 100 may be installed within and between the first portion mold side 114 and the second portion mold side, wherein load fitting 103 of the overbraided mandrel 100 is installed within the at least one load fitting mold side 115.

Figure 11:
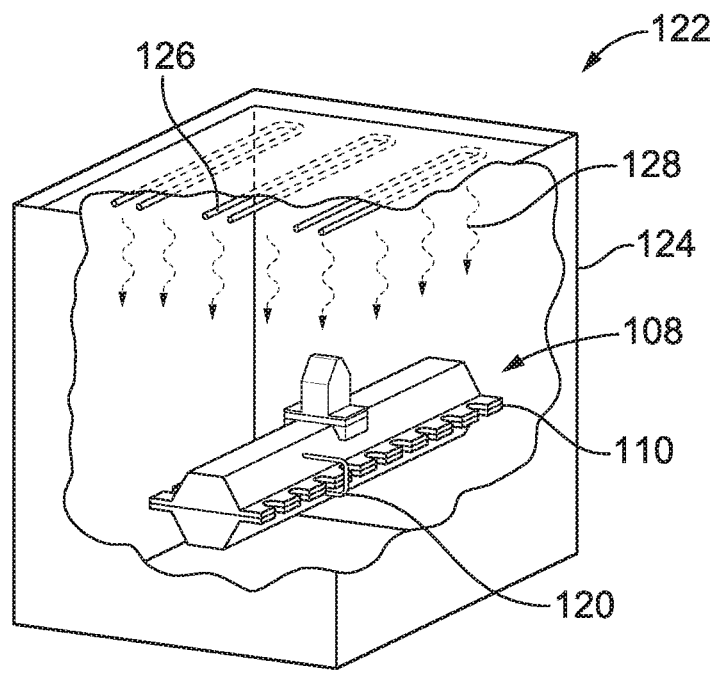
FIG. 11 is an illustration of a cut-away perspective view of an overbraided mandrel embedded with at least one load fitting installed in a matched tooling assembly being heated in a heating apparatus that may be used in method embodiments of the disclosure.

Additionally, at least one load fitting member lid 118 may be installed on the load fitting 103 to complete the matched tooling assembly 108. As shown in FIG. 11, once the matched tooling assembly 108 is closed around the overbraided mandrel embedded with the load fitting 100, the first portion 112 and the second portion 116 of the matched tooling assembly 108 may be held together via a holding element 120, such as a clamp or other suitable device.

Returning to FIG. 13, the method 200 further comprises step 212 of heating in a heating apparatus 122 the matched tooling assembly 108 with the installed overbraided mandrel embedded with the load fitting 100. In one preferred arrangement, heating of the overbraided mandrel 100 takes place at a specified heating profile in order to consolidate the plurality of inner layers of thermoplastic composite material 96a and plurality of outer layers of thermoplastic composite material 96b so as to form a thermoplastic composite tubular structure embedded with at least one load fitting (see FIG. 8).

FIG. 11 is an illustration of a cut-away perspective view of the matched tooling assembly 108, such as in the form of the clamshell metallic tooling assembly 110, being heated in the heating apparatus 122 that may be used in the method 200 (as well as in method 250 (see FIGS. 14A-B) and method 300 (see FIGS. 15A-B)) of the disclosure.

As shown in FIG. 11, the heating apparatus 122 comprises a convection oven 124 comprising heating elements 126. These heating elements emit heat 128 in order to consolidate the plurality of inner layers of thermoplastic composite material 96a and the plurality of outer layers of thermoplastic composite material 96b with at the load fitting 103. The method 200 may allow for fabrication of thermoplastic composite tubular structures embedded with at least one load fitting point in a completely out of autoclave fabrication method by applying pressure internally using the expandable material of the mandrel 70. However, although a convection oven 124 is shown in FIG. 11, the heating apparatus 122 may also consist of an induction oven, an induction heated matched tooling assembly, an autoclave, an integrally heated tooling assembly, or another suitable heating apparatus.

Preferably, the specified heating profile comprises a heating temperature in a range of from about 150 degrees Fahrenheit to about 800 degrees Fahrenheit. More preferably, the heating temperature is in a range of from about 400 degrees Fahrenheit to about 750 degrees Fahrenheit. Most preferably, the heating temperature is in a range of from about 550 degrees Fahrenheit to about 710 degrees Fahrenheit. Preferably, the specified heating profile comprises a heating time in a range of from about 5 minutes to about 120 minutes. More preferably, the heating time is in a range of from about 10 minutes to about 60 minutes.

Upon heating in the heating apparatus 122, the expandable material 72 of the mandrel 70 preferably expands and exerts pressure on the plurality of inner layers of thermoplastic composite material 96a and plurality of outer layers of thermoplastic composite material 96b (see FIGS. 7, 8A, and 8B) against the matched tooling assembly 108. This expansion causes consolidation or hardening of the inner layers of thermoplastic composite material 96a and outer layers of thermoplastic composite material 96b with at least the load fitting 103 so as to form a thermoplastic composite tubular structure embedded with the load fitting, such as the thermoplastic composite tubular structure embedded with the load fittings 26 illustrated in FIG. 1.

As used herein, the terms "consolidate" or "consolidation" mean hardening or toughening of the thermoplastic composite material under heat and/or pressure to form a unitary structure, e.g., thermoplastic composite tubular structure, and cooling of the hardened or toughened unitary structure. Heating methods may include induction, microwave, ultrasonic, resistance, hot jet, laser, autoclave, plasma, or another suitable heating method, and pressurizing techniques may include mold, contact, fiber tension, roller, vacuum bagging or another suitable pressurizing technique. During consolidation, the heat and/or pressure results in flow of resin and wetting of reinforcing fibers of the thermoplastic composite material. Preferably, the pressure exerted by the mandrel 70 on the inner layers of thermoplastic composite material 96a and the outer layers of thermoplastic composite material 96b may be in a range of from about 100 psi (pounds per square inch) to about 400 psi. In addition, by providing a metallic clamshell tooling assembly 110 with smooth, polished surfaces, where pressure is being generated from the inside out, any wrinkles or deformations on the outside of the consolidated or hardened formed thermoplastic composite tubular structure embedded with the load fitting may be avoided or minimized.

Returning to FIG. 13, the method 200 further comprises step 214 of cooling the matched tooling assembly 108 with the formed thermoplastic composite tubular structure 26 at a specified cooling profile. The specified cooling profile preferably comprises a temperature below a glass transition temperature of the thermoplastic composite material 96a and the thermoplastic composite material 96b. As shown in FIG. 13, the method 200 further comprises step 266 of removing the formed thermoplastic composite tubular structure from the matched tooling assembly 108. The method 300 illustrated in FIGS. 15A-B includes a similar process step 316.

Figure 12:
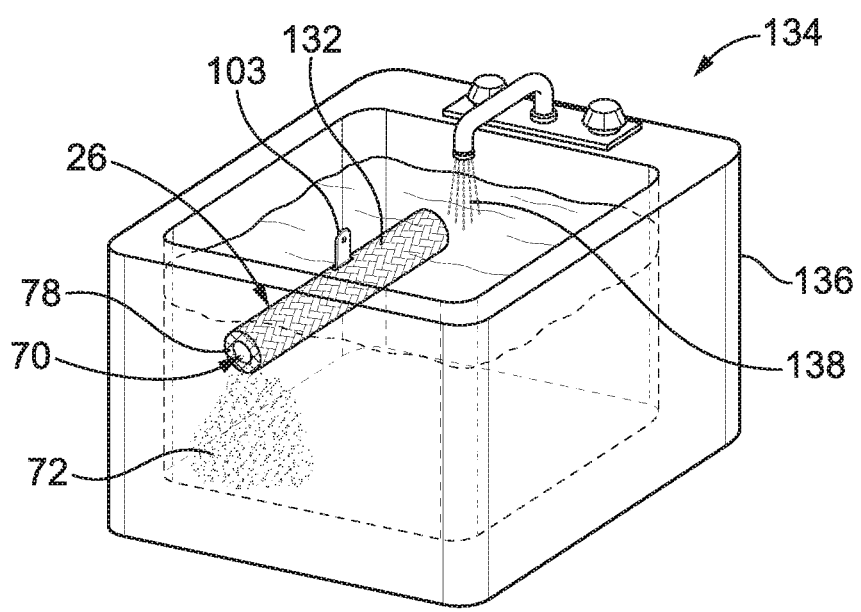
FIG. 12 is an illustration of a perspective view of a mandrel embedded with at least one load fitting being washed out of the formed thermoplastic composite tubular structure in a mandrel removal apparatus that may be used in method embodiments of the disclosure.

As shown in FIG. 13, the method 200 further comprises step 218 of solubilizing the mandrel 70 so as to remove the mandrel 70 from the formed thermoplastic composite tubular structure 26. For example, FIG. 12 is an illustration of a perspective view of the mandrel 70 being washed out of the formed thermoplastic composite tubular structure embedded with at least one load fitting 26 in a mandrel removal apparatus 134 that may be used in the method 200 (as well as in method 250 (see FIGS. 14A-B) and method 300 (see FIGS. 15A-B)) of the disclosure. As shown in FIG. 12, the mandrel removal apparatus 134 may comprise a washing vessel 136, such as a sink, that dispenses water 138 or another water-based solution to wash out and to permanently remove the mandrel 70, such as in the form of the tubular mandrel 78, from the formed thermoplastic composite tubular structure embedded with the load fitting 26, such as in the form of a thermoplastic composite tube 132. Solubilizing the mandrel 70 thus further comprises solubilizing the mandrel 70 with water 138 or a water-based solution to permanently remove the mandrel 70 from the formed thermoplastic composite tubular structure 26. The mandrel 70 may be solubilized and washed out of the formed thermoplastic composite tubular structure 26 in pieces or portions of the soluble, expandable material 72 that forms the mandrel 70. The removed mandrel 70 or soluble, expandable material 72 may be discarded or recycled.

In another arrangement of the disclosure, there is provided a thermoplastic composite tubular structure embedded with at least one load fitting 26 (see FIG. 8) fabricated by the method 200 discussed above. The thermoplastic composite tubular structure embedded with at least one load fitting point 26 may comprise a thermoplastic composite tube 132 (see FIG. 8), a pipe, a duct, an elongate hollow structure, or another suitable thermoplastic composite tubular structure, and may be cylindrical or non-cylindrical and may be linear or non-linear.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A thermoplastic composite tubular structure embedded with a first load fitting, comprising:
   a first plurality of inner layers of thermoplastic composite material braided around a mandrel,
   the mandrel comprising a soluble, expandable material and comprising a mandrel cross-section defining a first closed geometric shape;
   the first load fitting placed on the first plurality of inner layers of thermoplastic composite material, wherein the first load fitting comprises a main body and a clevis that extends from a central portion of the main body, the first load fitting treated with an adhesion promoter prior to placing the loading fitting on the first plurality of inner layers; and
   a second plurality of outer layers of thermoplastic composite material overbraided around the main body of the first load fitting and the mandrel so as to form an overbraided mandrel embedded with the first load fitting.

2. The thermoplastic composite tubular structure of claim 1, wherein the soluble, expandable material of the mandrel is selected from the group consisting of one or more of ceramic, sand, a polymer binder, a soluble organic binder, a soluble inorganic binder, sodium silicate, graphite, one or more additives, and one or more preservatives.

3. The thermoplastic composite tubular structure of claim 1, wherein the first closed geometric shape is selected from the group consisting of a circle, a semi-circle, a rectangle, an oval, an ellipse, a parallelogram, a trapezoid, a rhombus, a curvilinear triangle, a crescent, a quadrilateral, a quatrefoil, and a polygon comprising a triangle, a square, a pentagon, a hexagon, a heptagon, an octagon, a nonagon, a decagon, a hendecagon, and a dodecagon.

4. The thermoplastic composite tubular structure of claim 1, wherein the first closed geometric shape is a circle.

5. The thermoplastic composite tubular structure of claim 1, wherein the plurality of inner layers of thermoplastic composite material are materials selected from the group consisting of carbon fiber composite material; carbon fiber reinforced polymer material including carbon fiber reinforced polyphenylene sulfide (PPS), carbon fiber reinforced polyetheretherketone (PEEK), carbon fiber reinforced polyetherketoneketone (PEKK), and carbon fiber reinforced polyetherimide (PEI); and nylon.

6. The thermoplastic composite tubular structure of claim 5, wherein the plurality of outer layers comprise the same type of material as the plurality of inner layers.

7. The thermoplastic composite tubular structure of claim 5, wherein the plurality of outer layers comprise a different type of material as the plurality of inner layers.

8. The thermoplastic composite tubular structure of claim 1, wherein the plurality of inner layers of thermoplastic composite material are in a form selected from the group consisting of a continuous slit tape thermoplastic composite material, a prepreg unidirectional tape, a prepreg fabric, a commingled fiber material, and a quasi-isotropic or anisotropic continuous fiber thermoplastic composite material.

9. The thermoplastic composite tubular structure of claim 1, wherein the plurality of outer layers of thermoplastic composite material overbraided around the main body of the first load fitting and the mandrel is tailored to a depth relating to a type and magnitude of a load being introduced to the thermoplastic composite tubular structure embedded with the first load fitting.

10. The thermoplastic composite tubular structure of claim 1, wherein the first plurality of inner layers comprises a first braided configuration; and the second plurality of outer layers comprises a second braided configuration.

11. The thermoplastic composite tubular structure of claim 10, wherein the first braided configuration is different than the second braided configuration.

12. The thermoplastic composite tubular structure of claim 10, wherein the first braided configuration is the same as the second braided configuration.

13. The thermoplastic composite tubular structure of claim 12, wherein the first braided configuration and the second braided configuration comprise a biaxial braided configuration.

14. The thermoplastic composite tubular structure of claim 12, wherein the first braided configuration and the second braided configuration comprise a triaxial braided configuration.

15. The thermoplastic composite tubular structure of claim 10, wherein the first braided configuration comprises a biaxial braided configuration and the second braided configuration comprises a triaxial braided configuration.

16. The thermoplastic composite tubular structure of claim 1, wherein the first load fitting comprises a metallic material selected from the group consisting of titanium, carbon composite, aluminum, and stainless steel.

17. The thermoplastic composite tubular structure of claim 1, further comprising a second load fitting.

18. The thermoplastic composite tubular structure of claim 17, wherein the second load fitting is placed on the first plurality of inner layers of thermoplastic composite material.

19. The thermoplastic composite tubular structure of claim 17, wherein the first load fitting and the second load fitting are aligned with one another.

20. The thermoplastic composite tubular structure of claim 17, wherein the first load fitting and the second load fitting are offset from one another.

* * * * *